(12) United States Patent
Ho et al.

(10) Patent No.: US 10,397,457 B2
(45) Date of Patent: Aug. 27, 2019

(54) CAMERA MODULE

(71) Applicant: SAE Magnetics (H.K.) Ltd., Hong Kong (CN)

(72) Inventors: Yiu Sing Ho, Hong Kong (CN); Wen Ju Yang, GuangDong (CN); Jing Shu Shi, GuangDong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 74 days.

(21) Appl. No.: 15/661,236

(22) Filed: Jul. 27, 2017

(65) Prior Publication Data

US 2018/0035027 A1 Feb. 1, 2018

(30) Foreign Application Priority Data

Jul. 27, 2016 (CN) .......................... 2016 2 0800229

(51) Int. Cl.
*H04N 5/225* (2006.01)

(52) U.S. Cl.
CPC ......... *H04N 5/2256* (2013.01); *H04N 5/2253* (2013.01); *H04N 5/2254* (2013.01); *H04N 5/2257* (2013.01)

(58) Field of Classification Search
CPC .. H04N 5/2256; H04N 5/2257; H04N 5/2253; H04N 5/2254
See application file for complete search history.

(56) References Cited

U.S. PATENT DOCUMENTS

| 8,548,316 B2* | 10/2013 | Lee .......................... G03B 7/16 396/108 |
| 2015/0085181 A1* | 3/2015 | Chen .................... H04N 5/2354 348/371 |

* cited by examiner

*Primary Examiner* — Ahmed A Berhan
(74) *Attorney, Agent, or Firm* — Nixon & Vanderhye PC

(57) ABSTRACT

A camera module includes a lens assembly, a voice coil motor assembly, an image sensor assembly and a flash assembly. The lens assembly is installed in the voice coil motor assembly along an optical axis direction, the image sensor assembly is located below the lens assembly, the flash assembly is mounted above the voice coil motor assembly and includes at least one light source located around a lens of the lens assembly, and the light source adapted for providing a flash for the lens. The flash assembly can provide uniform and even flashing light for the lens to improve imaging quality, and provide compact structure to meet the development of the electronic products miniaturization.

7 Claims, 5 Drawing Sheets

CAMERA MODULE

This application claims priority to CN Patent Application No. 201620800229.8 filed Jul. 27, 2016, the entire contents of which are hereby incorporated by reference.

FIELD OF THE INVENTION

The present invention relates to camera modules, and in particular, to a camera module with a flash assembly.

BACKGROUND OF THE INVENTION

As shown in FIG. 1, a conventional camera module 100 includes a lens assembly 110, a motor assembly 120, a color filter assembly 130 and an image sensor assembly 140. A conventional lens assembly 110 includes a lens barrel 111 and a lens holder 112, multiple lens are stacked in the lens barrel 111, and the lens barrel 111 and the lens holder 112 are connected together by means of screw thread. The motor assembly 120 is commonly a voice coil motor assembly, the color filter assembly 130 is located below the motor assembly 120, and the color filter assembly 130 includes a color filter 131 and a base 132 for supporting this color filter 131, specifically, the base 132 is pressing against a base 121 of the motor assembly 120 to assemble together. The image sensor assembly 140 includes a PCB 142 and a CMOS chip 141 mounted on the PCB 142.

For improving the imaging quality, a flash light is commonly configured at a lower position or a side of the camera module to fill light under ambient with insufficient brightness. However, due to the position of the flash light is far from the lenses in the camera module, thus the lenses could not receive uniform and even light, which cause the brightness of the images is not even to degrade the imaging quality. In addition, the flash light may take up additional space of the camera or the cell phone, to increase the size.

Thus it is desired to provide an improved camera module to overcome the drawbacks mentioned above.

SUMMARY OF THE INVENTION

One objective of the present invention is to provide a camera module with a flash assembly, which can provide uniform and even flashing light for the lens to improve imaging quality, and provide compact structure to meet the development of the electronic products miniaturization.

To achieve above objective, a camera module includes a lens assembly, a voice coil motor assembly, an image sensor assembly and a flash assembly. The lens assembly is installed in the voice coil motor assembly along an optical axis direction, the image sensor assembly is located below the lens assembly, the flash assembly is mounted above the voice coil motor assembly and includes at least one light source located around a lens of the lens assembly, and the light source adapted for providing a flash for the lens.

Preferably, the flash assembly comprises multiple light sources, a mounting plate for supporting and mounting the light sources, and a cover covering the light sources.

Preferably, four light sources are uniformly distributed around the lens to define a shape which is coaxial with the optical axis direction.

Preferably, four light sources are located at four corners of the mounting plate.

Alternatively, three light sources are uniformly distributed around the lens to define a shape which is coaxial with the optical axis direction.

Preferably, the mounting plate is connected to the voice coil motor assembly by gluing and welding.

Preferably, the cover is connected to the voice coil motor assembly by a clamping structure.

Preferably, the light source is a LED.

In comparison with the prior arts, since the camera module of the present invention is installed with the flash assembly, and the flash assembly is mounted above the voice coil motor assembly, further the light sources of the flash assembly are located around the lenses of the lens assembly to provide uniform flashing light for the lenses, thus the imaging quality is improved. Furthermore, because the flash assembly is integrated into the camera module, instead of set outside the camera module, thus the structure is compact, and the size is reduced to meet the development of the electronic products miniaturization.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
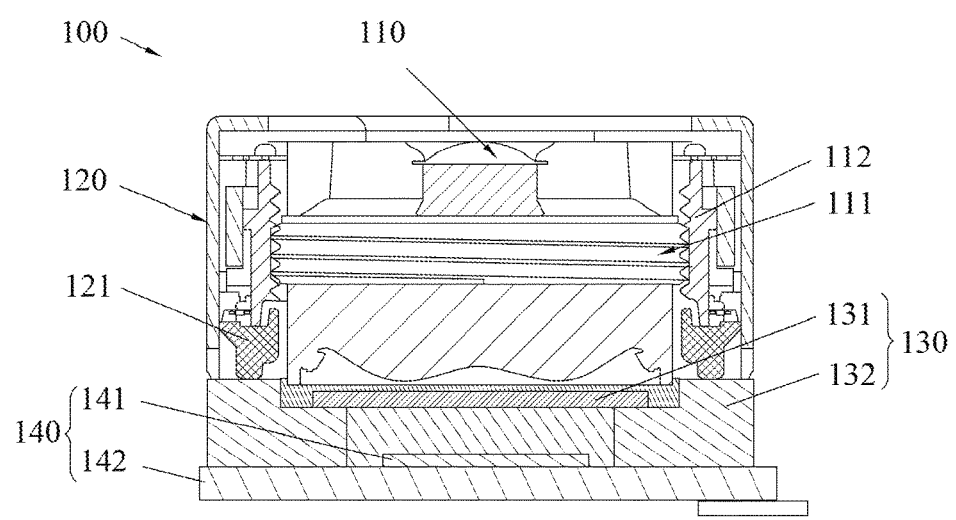
FIG. 1 is a cross-sectional view of a conventional camera module.

Various preferred embodiments of the invention will now be described with reference to the figures, wherein like reference numerals designate similar parts throughout the various views. As indicated above, the invention is directed to a camera module with a flash assembly, which can provide uniform and even flashing light for the lens to improve imaging quality, and provide compact structure to meet the development of the electronic products miniaturization.

Figure 2:
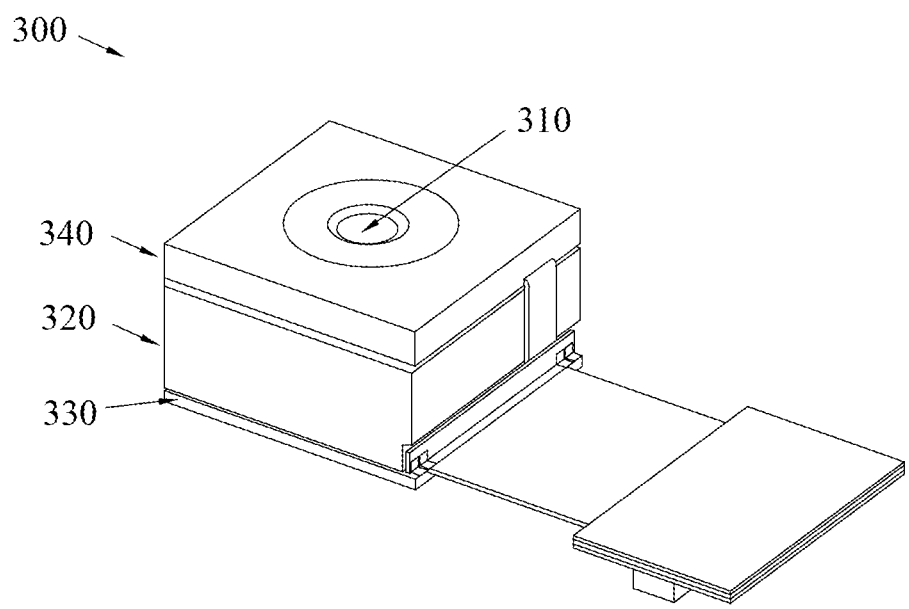
FIG. 2 is a perspective view of a camera module according to one embodiment of the present invention.
Figure 3:
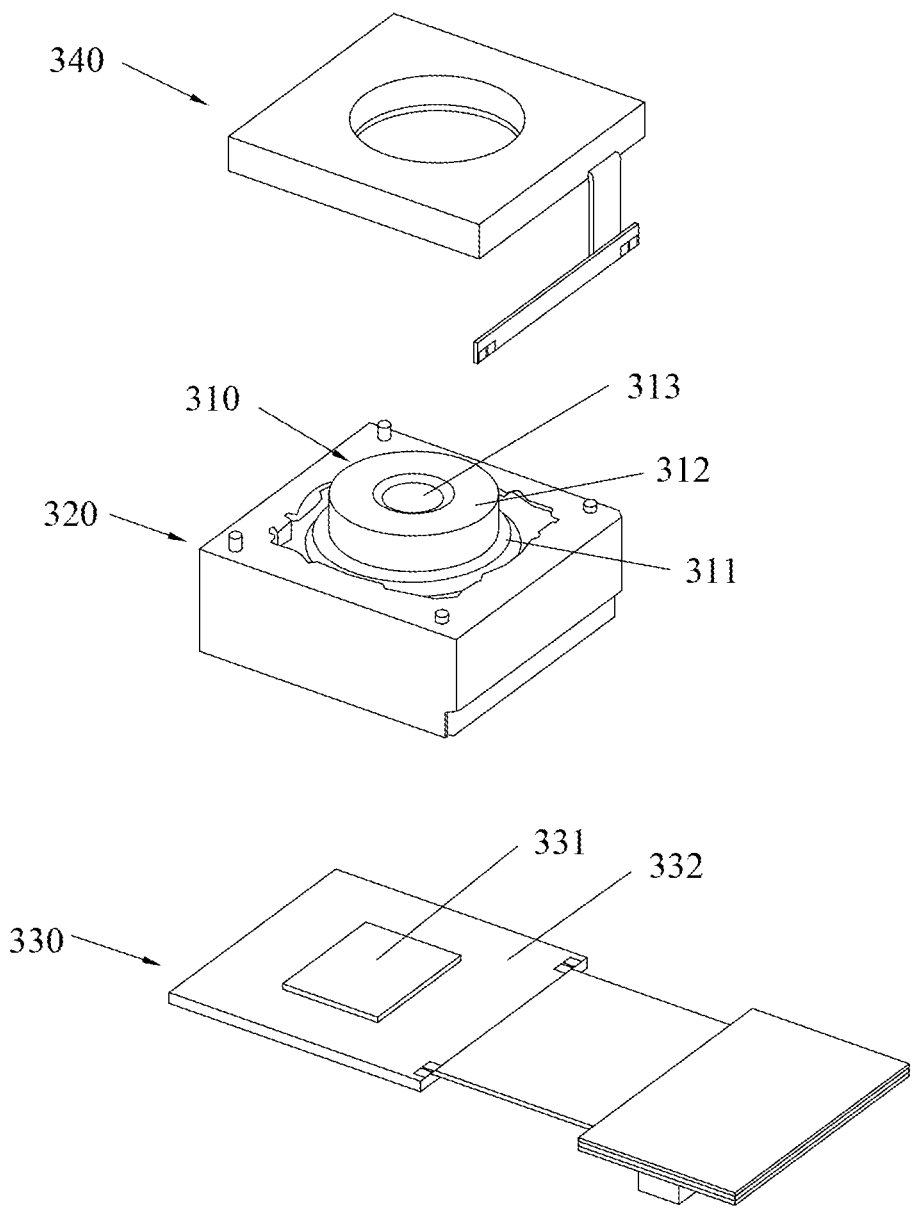
FIG. 3 is an exploded view of FIG. 2.

Referring to FIGS. 2-3, a camera module 300 according to one embodiment of the present invention includes a lens assembly 310, a voice coil motor assembly 320, an image sensor assembly 330, and a flash assembly 340. Specifically, the lens assembly 310 includes a lens holder 311, a lens barrel 312 and lenses 313 stacked in the lens barrel 312, and the lens barrel 312 is mounted in and held by the lens holder 311. For example, the lens barrel 312 and the lens holder 311 are connected together by means of screw thread, or formed as an integrated structure. In this embodiment, each component of the lens assembly 310 and connections may be consistent with the conventional one, which is omitted here. Specifically, the lens assembly 310 is installed in the voice coil assembly 320 along the optical axis direction, and the image sensor assembly 330 is located below the lens assembly 310 and assembled with the lens assembly 310. The voice coil motor assembly 320 includes a housing 321, a base, springs, magnetic elements, coils and gaskets (not shown in detail), the detailed structures and the assembly process of these elements are well known, and thus which are omitted here. The image sensor assembly 330 includes an image sensor 331 and a PCB 332, specifically, the image sensor 331 can be CMOS chip which is mounted on the PCB 332. The flash assembly 340 is configured above the voice coil motor assembly 320, and light sources thereof are configured around the lenses 313 to provide sufficient light. Detailed descriptions follow.

Figure 4:
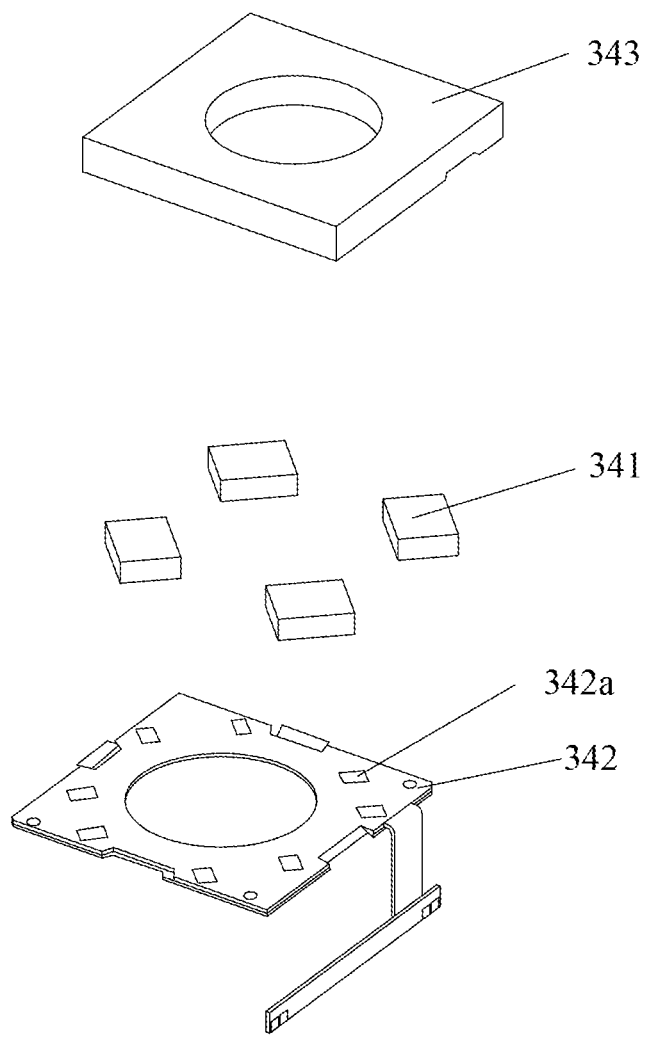
FIG. 4 is an exploded view of a flash assembly shown in FIG. 3.

As shown in FIG. 4, the flash assembly 340 includes multiple light sources 341, a mounting plate 342 for supporting and mounting the light sources 341, and a cover 343 covering the light sources 341. Specifically, the mounting plate 342 is a circuit board, whose shaped is corresponding with that of the camera module 300. Holes are formed on the mounting plate 342. The light sources 341 are mounted on the mounting plate 342, and the mounting plate 342 is provided with welding portions 342a for connected with the PCB 332. The cover 343 has the corresponding shape with the mounting plate 342, which is made of transparent materials to allow lights to permeate when the cover 343 is covered on the light sources 341. In this embodiment, the light sources 341 include four LEDs, which are located at four corners of the mounting plate 342. However, the amount of the LED is not limited, two or three, or even more LEDs are still suitable. More specifically, four light sources 341 are uniformly distributed at four corners of the mounting plate 342 to define a circle which is coaxial to the optical axis of the lenses 313. In such a way, the intensity of the light emitted from the four light sources 341 is uniform, thus even and consistent light could be received by the lenses. In other embodiments, two LEDs 341 can be located at catercorner of the mounting plate 342; three LEDs 341 are located at three corners of the mounting plate 342 to define a rough circle coaxial to the optical axis. In other embodiments, the light sources 341 can be set around the center hole of the mounting plate 342 to form round light band or rectangular light band, so as to achieve flashing function.

Figure 5:
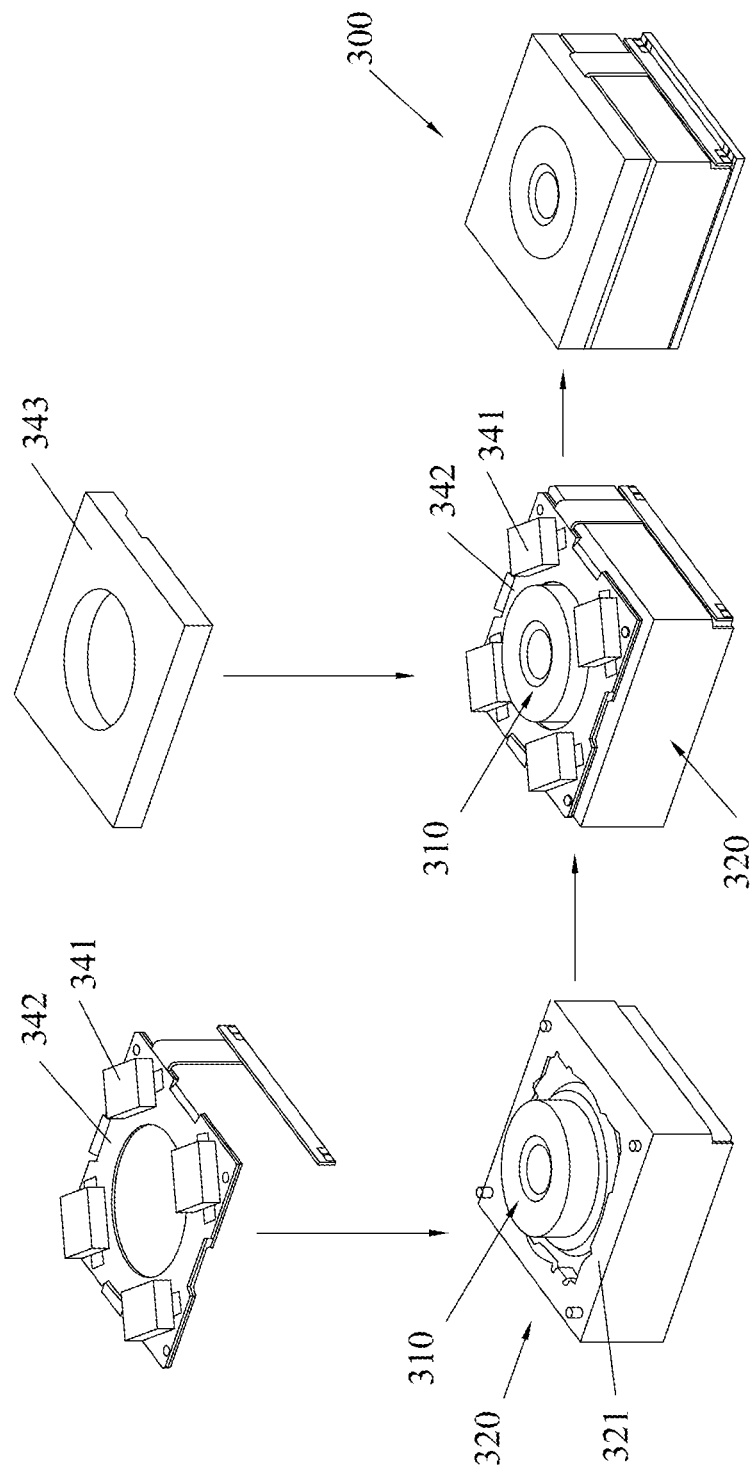
FIG. 5 is an assembly view of the camera module according to one embodiment of the present invention.

FIG. 5 shows the assembling process of the camera module of the present invention. Firstly, the voice coil motor assembly 320 and the lens assembly 310 are assembled together in advance, and the LEDs 341 are welded to the mounting plate 342; and then, the mounting plate 342 is pressed against the housing 321 of the voice coil motor assembly 320, and connection therebetween by gluing and welding is performed. Afterward, the cover 343 is covered on the LEDs 341, with the edge of the cover 343 is engaged with the housing 321 by a clamping structure to achieve the connection. Finally, the wholes of the voice coil motor assembly 320 with the cover 343 stalled and the lens assembly 310 are mounted on the image sensor assembly 330, and gluing, welding and drying follow, so far the assembly process of the camera module 300 is finished.

In comparison with the prior arts, since the camera module 300 is installed with the flash assembly 340, and the flash assembly 340 is mounted above the voice coil motor assembly 320, further the light sources 341 of the flash assembly 340 are located around the lenses 313 of the lens assembly 310 to provide uniform flashing light for the lenses 313, thus the imaging quality is improved. Furthermore, because the flash assembly 340 is integrated into the camera module 300, instead of set outside the camera module, thus the structure is compact, and the size is reduced to meet the development of the electronic products miniaturization.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A camera module, comprising a lens assembly, a voice coil motor assembly, an image sensor assembly and a flash assembly, the lens assembly being installed in the voice coil motor assembly along an optical axis direction, the image sensor assembly being located below the lens assembly, the flash assembly being mounted above the voice coil motor assembly and comprising at least one light source located around a lens of the lens assembly, and the light source being adapted for providing a flash for the lens, wherein the flash assembly comprises multiple light sources, a mounting plate for supporting and mounting the light sources, and a cover covering the light sources.

2. The camera module according to claim 1, wherein four light sources are uniformly distributed around the lens to define a shape which is coaxial with the optical axis direction.

3. The camera module according to claim 1, wherein four light sources are located at four corners of the mounting plate.

4. The camera module according to claim 1, wherein three light sources are uniformly distributed around the lens to define a shape which is coaxial with the optical axis direction.

5. The camera module according to claim 1, wherein the mounting plate is connected to the voice coil motor assembly by gluing and welding.

6. The camera module according to claim 1, wherein the cover is connected to the voice coil motor assembly by a clamping structure.

7. The camera module according to claim 1, wherein the light source is a LED.

* * * * *